Aug. 14, 1945.    C. G. GERHOLD    2,382,871
METHOD OF MIXING FLUIDS
Filed April 21, 1943    2 Sheets-Sheet 1
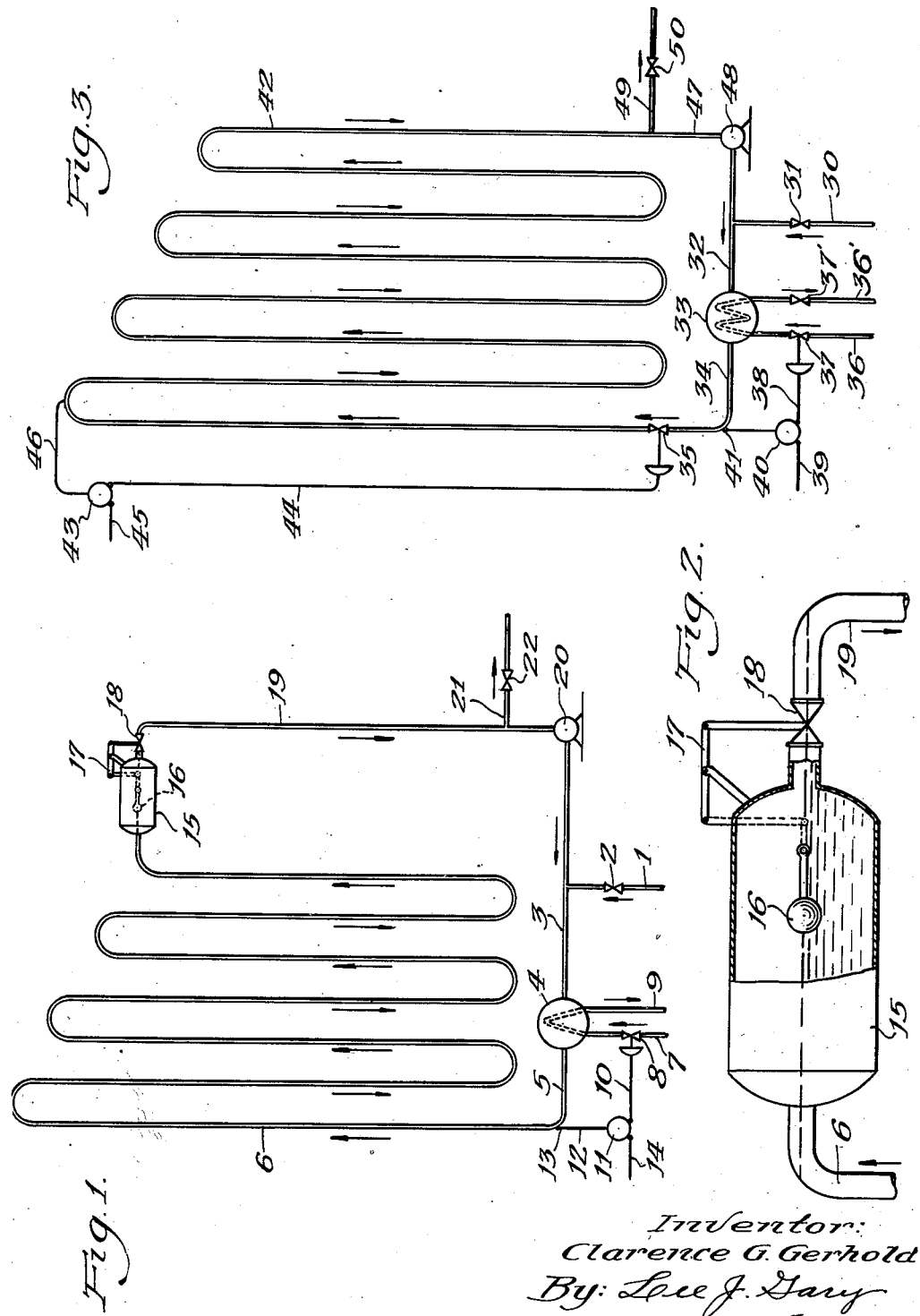
Inventor:
Clarence G. Gerhold
By: Lee J. Gary
Attorney Aug. 14, 1945. C. G. GERHOLD 2,382,871
METHOD OF MIXING FLUIDS
Filed April 21, 1943 2 Sheets-Sheet 2
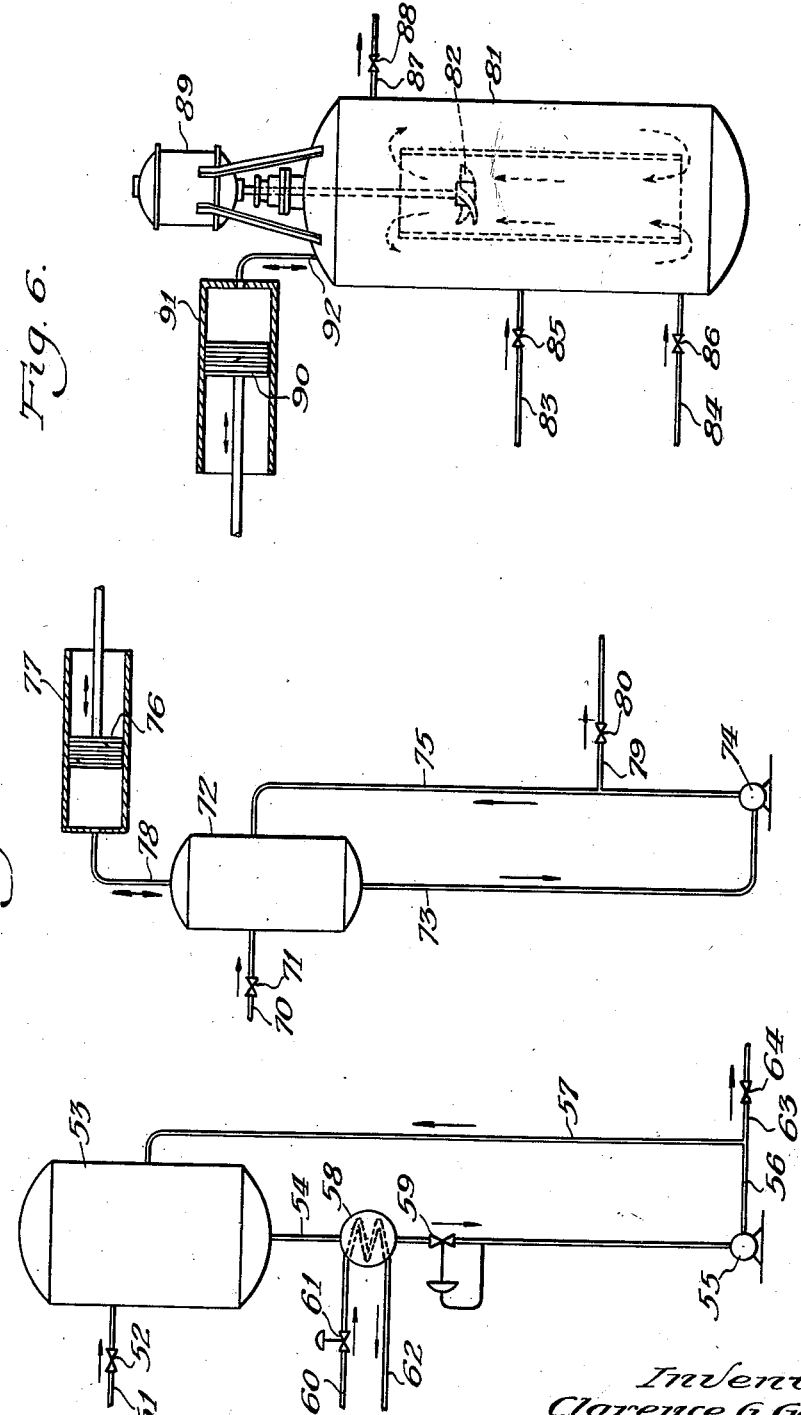
Inventor:
Clarence G. Gerhold
By: Lee J. Gary
Attorney Patented Aug. 14, 1945

2,382,871

UNITED STATES PATENT OFFICE 2,382,871

METHOD OF MIXING FLUIDS

Clarence G. Gerhold, Chicago, Ill., assignor to Universal Oil Products Company, Chicago, Ill., a corporation of Delaware Application April 21, 1943, Serial No. 483,919

9 Claims. (Cl. 252—314)

This invention relates to an improved method of mixing fluids and more particularly to a method of obtaining an intimate mixture of two or more immiscible phases.

The successful application of a number of processes depends upon obtaining an intimate mixture of two or more immiscible phases with a minimum power requirement.

This invention offers a method by which very intimate mixing may be obtained between two or more fluids by carrying out the mixing operation under varying pressure conditions. The pressure on the material undergoing treatment is alternated between one at which the material is completely liquid and one at which it is partially vaporized. During the operation it is preferable that the material being mixed is maintained in a turbulent state sufficient to prevent vapor separation.

By alternately decreasing and increasing the pressure on the material being mixed to an amount sufficient to cause alternate vaporization and condensation, a large number of points of stress will be set up uniformly distributed throughout the material and will result in a much more uniform and complete degree of mixing or emulsification than is obtained by conventional methods.

Broadly this invention is concerned with a method of mixing fluids which comprises alternately decreasing and increasing the pressure on said fluids to cause alternate vaporization and condensation of at least a portion thereof while maintaining the mixture in a state of turbulence sufficient to prevent substantial vapor separation.

In a more specific embodiment, the present invention comprises a method of emulsifying immiscible liquids which comprises alternately decreasing and increasing the pressure on said liquids to cause their alternate partial vaporization and substantially complete condensation while maintaining the liquids in a state of turbulence sufficient to prevent vapor separation.

This invention may be advantageously applied to the mixing of fluids in general and in particular to processes requiring intimate mixing of two or more immiscible phases for their successful operation. As examples of processes to which this invention may be applied may be mentioned the alkylation of paraffins with olefins using hydrogen fluoride or sulphuric acid.

In order to more clearly describe the invention, reference is made to the accompanying diagrammatic drawings and the following description thereof.

Figures 1, 3, 4, 5 and 6 of the drawings illustrate several types of apparatus in which this invention may be successfully carried out. Figure 2 of the drawings is an enlarged detail of a portion of the apparatus shown in Figure 1.

Referring now to Figures 1 and 2:

Materials to be mixed are introduced to the system through line 1 controlled by valve 2. It is, of course, within the broad scope of the invention to introduce the various materials into the system through separate lines but these have been eliminated in order to simplify the drawings. Materials to be mixed are directed by line 3 to heat exchanger 4 through which they will pass thereby attaining the desired temperature. From heat exchanger 4 the mixing materials will be directed by means of line 5 into a series of vertical U-bends 6. U-bends 6 are graduated in length in order to compensate for line pressure drop through the system.

In order to maintain the desired temperature in heat exchanger 4, suitable convective fluid is introduced thereto by means of line 7 controlled by valve 8 and removed therefrom by means of line 9. Valve 8 is a conventional type of diaphragm operated valve which is interconnected by means of line 10 to controller 11. Control instrument 11 is in turn connected by means of a capillary tube or electrical conduit 12 to a temperature sensitive element 13 located in line 5. Air pressure for operating control valve 8 is supplied to instrument 11 through line 14. Control instrument 11 may be any of several conventional types of temperature controllers used extensively in industry and available from any of several instrument manufacturers; for example, the Taylor Instrument Company, the Bristol Company, Brown Instrument Company, Foxboro Company, and many others.

After passing through the series of vertical U-bends 6, material will be discharged into float chamber 15 containing float 16 which is connected by a series of links and lever arm 17 to valve 18. The combination of the float in chamber 15 and regulating valve 18 is arranged to maintain a liquid level at approximately the center line of the upper extremity of each of the vertically disposed U-bends. In this manner, by maintaining the material at the proper temperature, there will be a sufficient decrease in pressure on rising material to cause vaporization when it reaches the upper end of each U-bend. As the material passes in a downward direction, the hydrostatic pressure will increase and cause condensation. Therefore, as the material successively rises and falls in U-bends 6, it will be subject to alternate changes in pressure which in turn will effect alternate vaporization and condensation.

The material leaving chamber 15 passes through line 19 to pump 20 wherefrom it is directed through line 3 to again pass through the system. Mixed material is removed from the system by means of line 21 controlled by valve 22. The rate of charge to the system, of course, will be substantially equivalent to the rate of withdrawal of mixed materials.

In Figure 3 is illustrated another form of apparatus in which the invention may be conducted. Material to be mixed is introduced through line 30 controlled by valve 31 and is commingled with circulating materials passing through line 32. The mixture is then passed through heat exchanger 33 wherein it will attain the proper temperature and wherefrom it is withdrawn by means of line 34 controlled by valve 35. The temperature of heat exchanger 33 is maintained by means of suitable convective fluid introduced through line 36 controlled by valve 37 which is interconnected by means of lines 38 and 39 to a suitable source of air pressure. The convective fluid may be withdrawn from heat exchanger 33 by means of line 36' controlled by valve 37'. The air pressure to valve 37 is regulated by temperature control instrument 40 which is interconnected by means of a capillary tube or electrical conduits to a temperature sensitive element 41 located in line 34. The material passing through valve 35 enters a series of vertically disposed U-bends 42, valve 35 being controlled by means of pressure controller 43 interconnected therewith by means of line 44. Air from a suitable source is introduced by means of line 45 to instrument 43 wherein this pressure is controlled and air at controlled pressure is supplied to valve 35 by means of line 44. Instrument 43 is a pressure sensitive instrument available from any of a large number of instrument manufacturers and is connected by means of a suitable conduit 46 to the upper extremity of one of the vertically disposed U-bends. The pressure at this point will be maintained to effect vaporization of at least a portion of the fluids being mixed at the temperature of operation. The successive rise and fall of the mixing materials through U-bends 42 will cause alternate vaporization and condensation due to the difference in hydrostatic head thereby resulting in more intimate mixing. The mixed materials pass from the vertical U-bends through line 47 into pump 48 wherefrom they are again circulated through the system. Mixed materials may be withdrawn from the system through line 49 controlled by valve 50.

Figure 4 illustrates another form of equipment suitable for the accomplishment of the invention. In this particular apparatus, materials to be mixed are introduced through line 51 controlled by valve 52 into reservoir 53. They are then withdrawn therefrom by means of line 54 and recirculated thereto by means of pump 55 and lines 56 and 57. Upon leaving vessel 53, the materials to be mixed are successively passed through heat exchanger 58 and pressure regulating valve 59. In heat exchanger 58 the mixing materials will attain the desired temperature and the pressure of said materials will be controlled by valve 59 to obtain a pressure on the suction side of pump 55 which is sufficiently low to vaporize a portion of the mixing materials. The temperature of exchanger 58 may be maintained at the desired degree by means of a suitable heat convective material supplied through line 60 and controlled by valve 61. The heat exchange medium may be withdrawn from exchanger 58 by means of line 62. By continually circulating the material to be mixed through the system and alternately changing the pressure therein by means of regulator 59 and pump 55, alternate vaporization and condensation will take place thereby effecting very intimate mixing. Mixed materials may be withdrawn from the system through line 63 controlled by valve 64.

In Figure 5 another form of apparatus suitable for conducting the method of this invention is shown. In this particular form, the materials to be mixed are introduced through line 70 controlled by valve 71 to vessel 72. From vessel 72 the materials are withdrawn by means of line 73 and pump 74 and returned by means of line 75 thereby causing a continuous circulation of materials from vessel 72 through pump 74 and back to the vessel. At the same time, the materials to be mixed are passing through this circulatory system, the pressure therein is continually varied by means of piston 76 operating in cylinder 77 which is interconnected with vessel 72 by means of line 78. By varying the pressure on the system to a degree sufficient to alternately cause vaporization and condensation as the materials are continually circulated, very intimate mixing is obtained. Mixed materials may be withdrawn from the system by means of line 79 controlled by valve 80.

Figure 6 is a modified form of the apparatus shown in Figure 5 in that a circulatory system is set up within vessel 81 by means of an impeller 82. Materials to be mixed are introduced to vessel 81 by means of lines 83 and 84 controlled by valves 85 and 86 respectively and mixed materials are withdrawn through line 87 controlled by valve 88. Impeller 82 is rotated by motor 89 or other suitable conventional means. The pressure in vessel 81 is varied by means of piston 90 acting in cylinder 91 which is connected to the vessel by means of line 92.

The foregoing description and the accompanying drawings are intended as illustrative of a few of the many means by which this invention may be accomplished and should not be construed as unduly limiting its broad scope.

I claim as my invention:

1. A method of mixing fluids which tend to segregate into separate phases when in contact with each other, said method comprising alternately decreasing and increasing the pressure on said fluids to cause alternate vaporization and condensation of at least a portion thereof while maintaining the mixture in a state of turbulence sufficient to prevent substantial vapor separation.

2. A method of mixing fluids which tend to segregate into separate phases when in contact with each other, said method comprising alternately decreasing and increasing the pressure on said fluids to cause alternate vaporization and condensation of at least a portion thereof while passing the mixture through a circulatory system and maintaining it in a state of turbulence sufficient to prevent vapor separation.

3. A method of mixing fluids which tend to segregate into separate phases when in contact with each other, said method comprising alternately decreasing and increasing the pressure on said fluids to cause their alternate partial vaporization and condensation while maintaining the mixture in a state of turbulence sufficient to prevent substantial vapor separation.

4. A method of mixing fluids which tend to segregate into separate phases when in contact with each other, said method comprising alternately decreasing and increasing the pressure on said fluids to cause their alternate partial vaporization and substantially complete condensation while maintaining the mixture in a state of turbulence sufficient to prevent substantial vapor separation.

5. A method of emulsifying immiscible liquids which comprises alternately decreasing and increasing the pressure on said liquids to cause their alternate vaporization and condensation while maintaining the liquids in a state of turbulence sufficient to prevent substantial vapor separation.

6. A method of emulsifying immiscible liquids which comprises alternately decreasing and increasing the pressure on said liquids to cause their alternate partial vaporization and substantially complete condensation while maintaining the liquids in a state of turbulence sufficient to prevent substantial vapor separation.

7. A method of emulsifying immiscible liquids which comprises alternately decreasing and increasing the pressure on said liquids to cause their partial vaporization and substantially complete condensation while passing said liquids through a circulatory system and maintaining them in a state of turbulence sufficient to prevent vapor separation.

8. A method for intimately mixing fluids which tend to segregate into separate phases when in contact with each other, said method comprising commingling the fluids to be mixed, subjecting the resultant mixture to alternately decreased and increased pressures, a portion of said mixture being vaporized under the decreased pressure and the increased pressure being sufficient to maintain the mixture substantially completely in liquid phase, and preventing separation of vapors from liquid by maintaining the mixture in a turbulent state during the subjection thereof to the aforesaid pressure conditions.

9. A method for intimately mixing immiscible liquids which comprises commingling the liquids to be mixed, subjecting the resultant mixture to alternately decreased and increased pressures, a portion of said mixture being vaporized under the decreased pressure and the increased pressure being sufficient to maintain the mixture substantially completely in liquid phase, and preventing separation of vapors from liquid by maintaining the mixture in a turbulent state during the subjection thereof to the aforesaid pressure conditions.

CLARENCE G. GERHOLD.